United States Patent
Leutenegger

Patent Number: 5,683,198
Date of Patent: Nov. 4, 1997

[54] CORNER JOINT

[75] Inventor: Simon Leutenegger, Zürich, Switzerland

[73] Assignee: Alusuisse Technology & Management Ltd., Switzerland

[21] Appl. No.: 760,635

[22] Filed: Dec. 4, 1996

Related U.S. Application Data

[63] Continuation of Ser. No. 457,979, Jun. 1, 1995, abandoned.

[30] Foreign Application Priority Data

Jun. 22, 1994 [CH] Switzerland ............... 1976/94

[51] Int. Cl.⁶ .................................................. F16B 9/02
[52] U.S. Cl. ........................... 403/231; 296/29; 403/403; 403/405.1
[58] Field of Search .................... 403/205, 230, 403/231, 401, 402, 403, 405.1; 296/29

[56] References Cited

U.S. PATENT DOCUMENTS

| | | | |
|---|---|---|---|
| 3,083,797 | 4/1963 | Wergin | 403/231 |
| 3,375,029 | 3/1968 | Frye et al. | 403/230 |
| 3,375,030 | 3/1968 | Thompson | 403/231 |
| 3,822,101 | 7/1974 | Schneider | 403/401 X |
| 4,278,361 | 7/1981 | Steinke | 403/231 X |
| 5,116,161 | 5/1992 | Faisst | 403/231 |
| 5,479,733 | 1/1996 | Kusina | 403/403 X |

FOREIGN PATENT DOCUMENTS

| | | | |
|---|---|---|---|
| 452256 | 10/1991 | European Pat. Off. | |
| 2119246 | 8/1972 | France | 403/230 |
| 1152852 | 8/1963 | Germany | 403/402 |
| 8701973 | 5/1987 | Germany | |
| 331865 | 9/1989 | Germany | 296/29 |
| 6603194 | 10/1966 | Netherlands | 403/231 |
| 1579941 | 11/1980 | United Kingdom | 403/230 |

*Primary Examiner*—Anthony Knight
*Assistant Examiner*—Andrea Chop
*Attorney, Agent, or Firm*—Bachman & LaPointe, P.C.

[57] ABSTRACT

A corner connector (3) joins together two orthogonally disposed sections (1, 2) with C-shaped connecting means. The sections (1,2) have two flanges (11) with a strut (12) on each projecting inwards. The corner connector (3) comprises two angular pieces (4), at least two wedging pieces (5), at least two bolts (6) and at least two clamping pieces (7). The angular pieces (4) have on each flange a wedging surface (22) that press against the nose (14) of the struts (12), and a wedging surface (28) on the side opposite the flange. The wedging piece (5) is drawn by bolt (6) over the wedging surface (28) between the flanges (20), causing the flanges (20) to be tensed against the section. The clamping pieces (7) engage on the projections (13) on the struts (12). The wedging pieces (5) tensed against the clamping pieces (7) do not cause the flanges (11) to be spread apart. This arrangement results in a joint exhibiting high bend strength and high tensile strength in particular by means of friction.

8 Claims, 4 Drawing Sheets

CORNER JOINT

This is continuation of application Ser. No. 08/457,979, filed Jun. 1, 1995 now abandoned.

BACKGROUND OF THE INVENTION

Corner joint effected between a first section with C-shaped connecting means and a second section with C-shaped connecting means which is at an angle to the first section, by means of a corner connector which exhibits two flanges that rest against the sections, said flanges being joined to the sections by at least one attachment means and a related counteracting-element, the sections exhibiting two parallel flanges and a strut on each flange on the side facing the other flange, and the corner connector comprising two mutually moveable angle pieces. Further, the invention also relates to an angle piece for the corner connector and the use of the corner joint.

A corner joint between a pair of sections with C-shaped connecting means using a corner connector is known from EP 0 452 256. This corner joint is capable of transferring some degree of bending moment. In practice it has been found that this particular corner joint can be improved considerably in terms of strength. It is a disadvantage that the corner joint according to EP 0 452 256 involves a considerable amount of effort for its assembly and requires appropriately qualified personnel for its use.

The object of the present invention is to overcome the above mentioned disadvantages and to propose a corner joint that can be installed without mistake and is such that large forces can be transmitted by friction.

SUMMARY OF THE INVENTION

This object is achieved by way of the invention in that, on the side facing away from the complementary angle piece (4), the angle pieces each exhibit a wedging face (22) along their flanges (20) resting against the sections (1,2) and on the opposite side of the flange a wedging face (28), both sections (1,2) have on both flanges (11) a ridge (13) running parallel to the strut (12), the ridges (13) are engaged by clamping piece (7) by virtue of shape, and the angle pieces (4) are spread apart by at least one wedging piece (5) which rests against the wedging faces (28) and is braced against the related section (1,2) by securing means (6).

The present corner joint and the related pressing of wedges into corresponding grooves enables large forces to be transmitted.

Advantageous versions of the present invention are presented in the following specification. The first and second sections, may be made, for example, of metal, plastic or a metal-plastic combination. Preferred metal is aluminum and aluminum alloys. Specially preferred sections are extruded sections.

The sections are arranged at an angle to each other. The sections may form any angle, for example from 30° to 90°, whereby an angle of 90° i.e. sections that are perpendicular to each other is normal. Means of securement may be for example bolts or rivets. Counteracting elements may be for example wedging pieces, conical sliding blocks, groove-fit sliding blocks or wedging strips. The wedging pieces or groove-fit sliding blocks exhibit a recess or blind hole which, according to the securing means in question, in particular when employing bolts as the means of securement, exhibits an internal thread. Wedging strips may for example also exhibit one or more recesses or blind holes, likewise with internal threads.

The clamping piece is for example a shaped part made of metal such as aluminum, an aluminum alloy, iron, steel, brass and the like. The clamping piece features at least one recess such as a hole through which the securing means can pass. The clamping piece may be in the form of a parallelogram-shaped plate, through which the securing means can pass, and featuring projections at its edge. Each of the struts exhibits a ridge running parallel to the strut. The ridges are usefully projections on the struts and the struts preferably exhibit a ridge facing the free end of the section flange which is engaged from behind by the projections on the clamping piece. This prevents the section flanges from being spread apart by the action of the wedging piece on tightening the securing means.

The angle pieces may be shaped parts made of plastic, metal or a combination of plastic and metal; preferred are angle pieces made of metals such as aluminum or aluminum alloys, iron, steel, brass etc. The angle pieces may be fabricated out of a solid mass; useful, however, are pressure die cast, cast, and/or forged angle pieces. The surfaces of the angle pieces may be provided with a roughening pattern at least in the region of mutual contact with the sections. Such a roughening pattern may be produced by sand-blasting, grinding, grooves, spark erosion, embossing etc. The pattern of roughness is present especially on the wedging surfaces.

BRIEF DESCRIPTION OF THE DRAWINGS

Exemplified embodiments of the invention are explained in the following with the aid of FIGS. 1 to 4. These show.

DETAILED DESCRIPTION OF PREFERRED EMBODIMENTS

Figure 1:
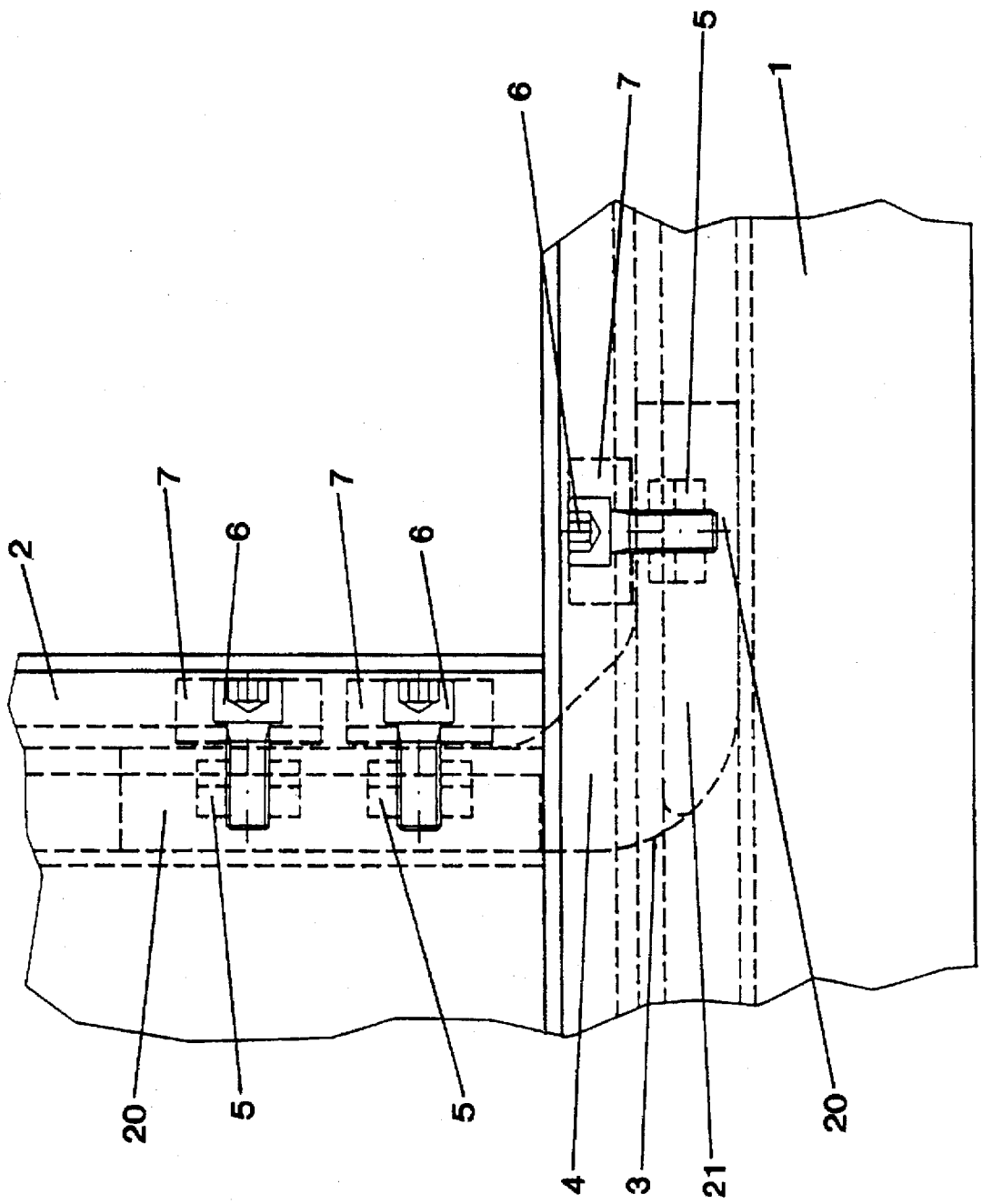
FIG. 1: A side elevation of a corner joint

FIG. 1 shows schematically a corner joint effected between a horizontal first section 1 and, butting onto this, a vertical section 2 e.g. a column forming part of a frame type structure. The sections 1,2 are, for example, extruded aluminum sections. The joint is made using one or two corner pieces 3 each of which comprises two angle pieces 4 with flanges 20 and outer face 21, three clamping pieces 7, three bolts 6 and three wedging pieces 5, e.g. conical sliding block. Section 1 may e.g. also form the edge of a composite panel.

Figure 2:
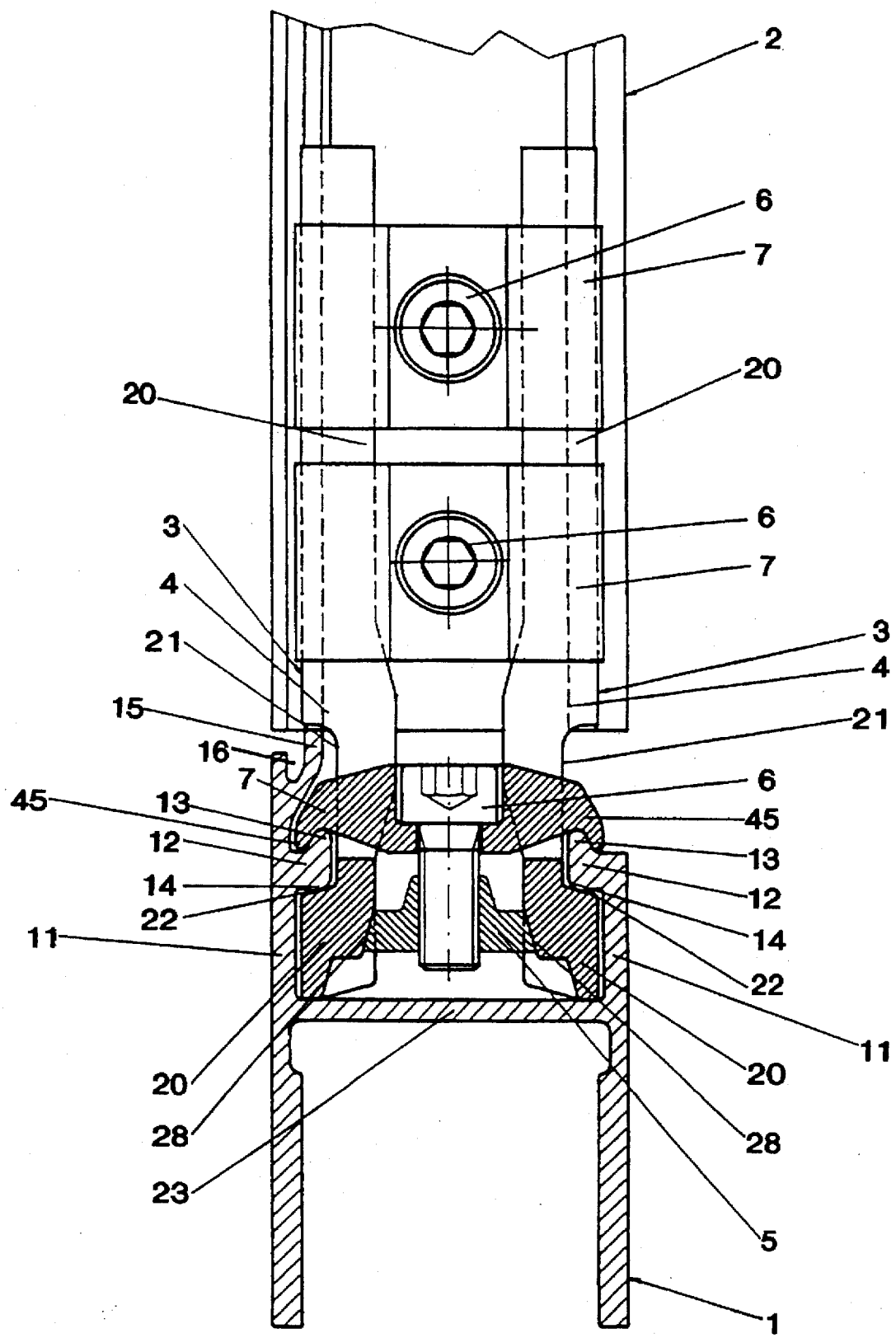
FIG. 2: A cross-section through a corner joint

FIG. 2 shows a cross-section through a corner joint 3 according to FIG. 1. Section 1 has at least one C-shaped connecting means with a base or a cross-strut 23, two parallel flanges 11 thereon and two struts 12 projecting inwards. At their free end, the struts 12 exhibit a nose 14 pointing towards the cross-strut 23. Struts 12 are tapered in a wedge shape manner towards their free end.

In the example shown here one section flange 11 is longer at its free end than the other flange 11, this by an extension 15 which features a groove 16. This groove 16 can accommodate windows, panels, flooring, sealing strips etc.

The angle pieces 4 exhibit straight-edged wedge faces 22 on the flanges 20 resting against the sections 1,2. The height of the flange 20 between its lower limiting edge and the wedging face corresponds approximately to the uninterrupted distance between the cross-strut 23 and the nose 14. The lower limiting edge of the flange 20 may be flat or slightly rounded.

The wedging face 22 running out from the outer face 21 is inclined at an angle of approx. 15° to the horizontal. The inner lying side of flange 20 of angle piece 4 exhibits a wedging face 28 which is inclined at an angle e.g. of approx. 15° to the vertical. The wedging face 28 may extend the whole length of each flange 20, or only parts of the flange may be shaped to form wedging faces. For that purpose the cross-section of the flange may be tapered in regions to form the wedging faces 28.

In order to make the joint, the flanges 20 of two angle pieces 4 are inserted between the struts 12 and the cross-strut 23 whereby the wedging faces 22 are pressed against nose 14. Wedges 5 e.g. conical sliding block are inserted below the angle pieces 4, in the region of the wedging faces 28; the inclination of the wedging faces of wedges 5 correspond to that of the wedging faces 28 of angle pieces 4. Wedging face 22 increases from the horizontal at a wedging angle of 5° to 30° and preferably about 15°, and wedging faces 28 deviate from the vertical by a wedging angle of 5° to 30° and preferably about 15°. In addition, the wedging angle of the wedging faces 22 of flanges 20 and the wedging faces 28 of wedge pieces 5 are self-restricting. A clamping piece 7, for example a parallelogram-shaped plate is placed on the ridges 13 of struts 12. The projections 45 of a clamping piece 7 lie on the outer side face of the ridge 13 i.e. the projections engage the ridge 13 from behind.

A means of securement, in the present example a bolt 6, passes through an opening such as a drilled hole in the clamping piece 7. The thread of the bolt 6 engages with a thread in the wedging piece 5. On turning the bolt 6, a tensile force is applied raising the wedging piece 5 with the result that the wedging faces 28 force the flanges 20 of angle piece 4 to spread apart. The flanges 20 are thereby forced outwards and wedged between the cross-strut 23 and the struts 12, in the process of which the wedging faces 22 slide outwards on nose 14. As the bolt 6 is tightened, the inner side of projection 45 of the clamping piece engages the ridge 13 of struts 12 and exerts a clamping action on sections 1,2. This prevents the flanges 11 from being pushed apart by the action of the wedging piece 5.

Adequate stability is achieved by the present corner joint e.g. already by securing one of the pairs of flanges 20 of a corner connecting piece with two bolts, wedging pieces and clamping pieces and the other pair of corner pieces 20 with a bolt, a wedging piece and a clamping piece. Each pair of flanges 20 may e.g. be secured by one, two or more bolts, wedging pieces and clamping pieces on the section in question. Instead of two or more wedging pieces and clamping pieces on one pair of flanges, it is also possible to employ wedging strips and/or clamping strips.

Figure 3A:
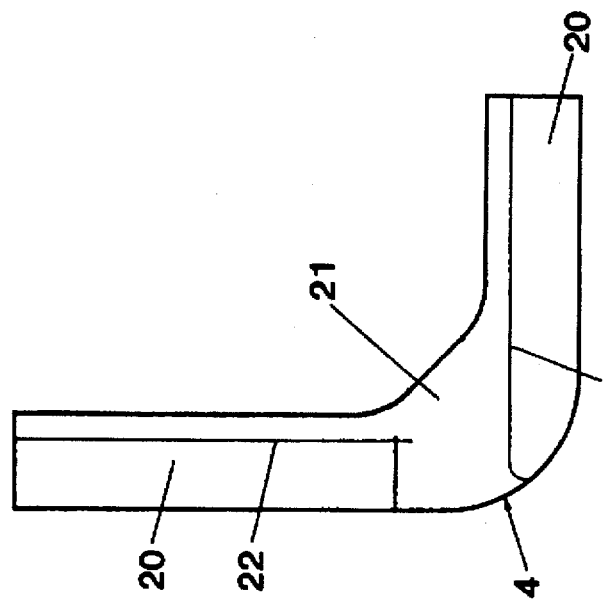
FIGS. 3a–e: Side elevation and a cross-section through a corner connecting piece and a section through the flange of the corner connecting piece at two different places.
Figure 3B:
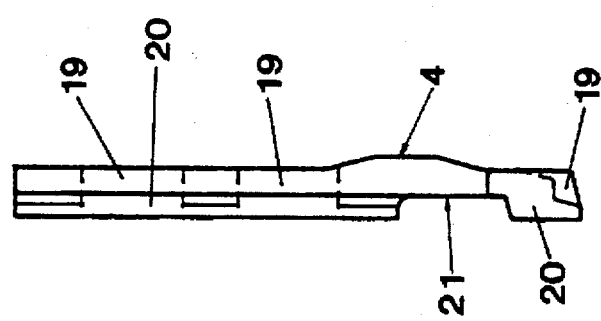
Figure 3C:
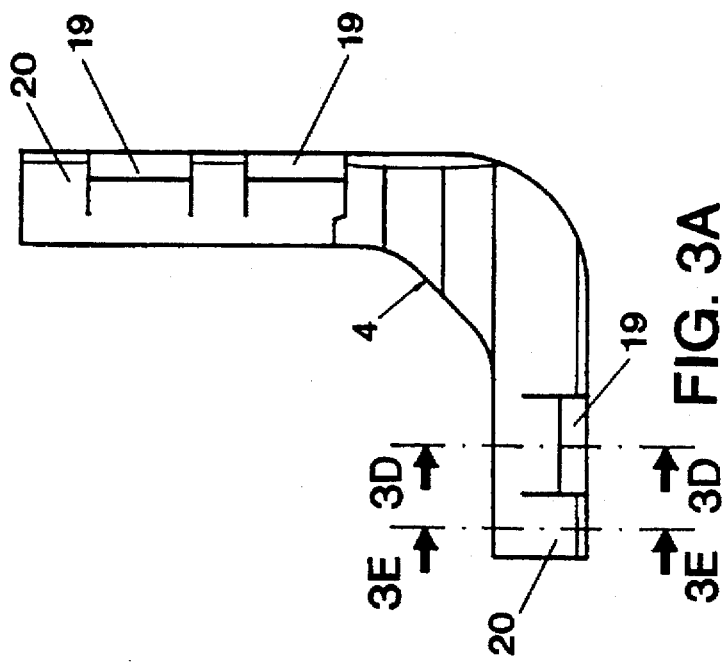
Figure 3D:
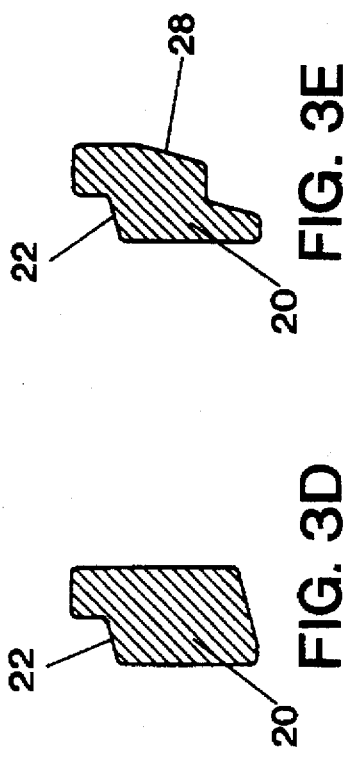
Figure 3E:
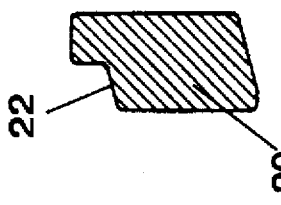

FIGS. 3a to e show an example of an angle piece 4. In FIG. 3a the angle piece is shown from the inner lying side i.e. the side that faces the other angle piece. A—A indicates the line of section through flange 20. The corresponding cross-section is shown in FIG. 3e. The cross-section along A—A refers only to the parts 19 of the flange 20 which are engaged by wedging pieces 5.

In the other regions of flange 20 the cross-section is as along section line B—B. This cross-section is shown in FIG. 3d.

FIG. 3b shows a view of the end of an angle piece 4 with flange 20, outer face 21 and positions 19 for location of the wedging pieces. FIG. 3c shows the outward facing side of the angle piece. The outer side is indicated by the numeral 21 and the flanges 20 essentially form the angle piece 4. The wedging faces 22 are shaped by forming the flange 20 or by removing surrounding material therefrom.

Figure 4B:
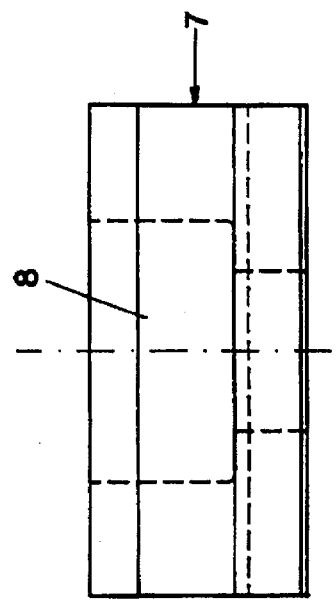
FIGS. 4a–c: Views of a clamping piece.
Figure 4A:
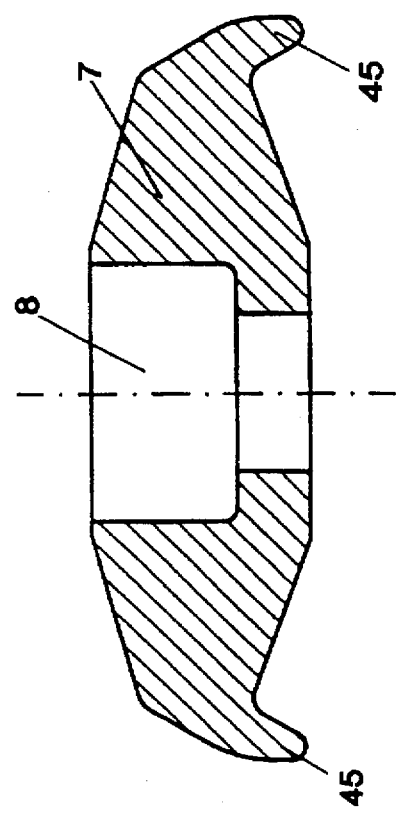
Figure 4C:
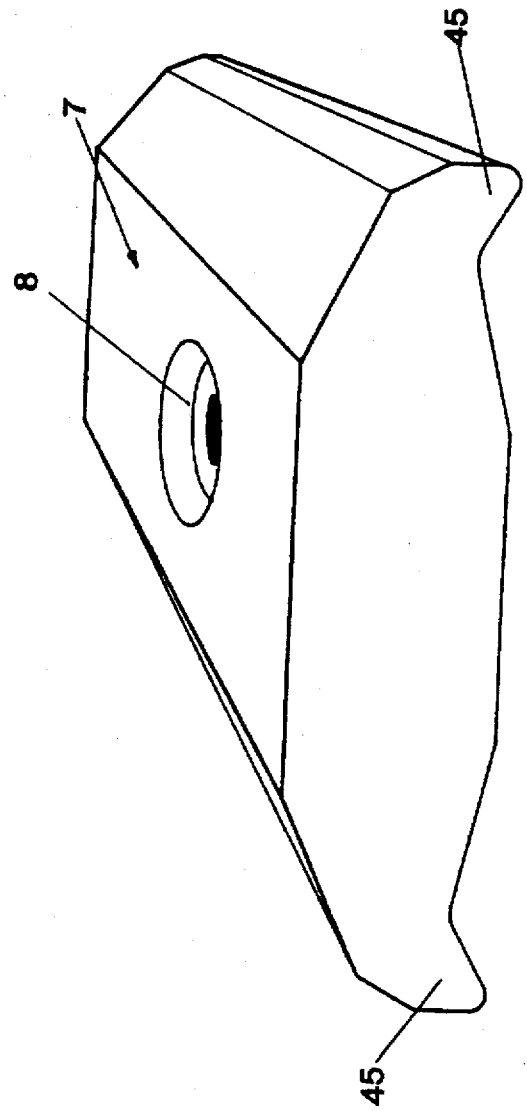

FIGS. 4a–c show a clamping piece 7 with opening 8 for e.g. a bolt 6 (not shown here) and the projections 45 which span the ridges 13 of struts 12 of sections 11. The opening 8 is preferably a hole which is round in cross-section. In its upper region the hole is wider in order to accommodate the head of a bolt or screw.

The corner joint according to the invention is such that the forces acting on the sections are transmitted to the corner connecting pieces. These connecting pieces transfer the forces by means of friction in that a wedge is pressed into a groove and is secured in the longitudinal direction of the wedge, and also perpendicular to the wedge in that the groove and wedge interlock by virtue of shape. Groove or wedge may lie in the corner connecting piece or in the load-bearing section. The direction for pressing in is typically perpendicular to the plane in which both load-bearing sections lie.

If bolts are employed as a securing means, then the threads may be treated with self-restricting means such as e.g. temporary or permanent adhesives. Such adhesives are for example introduced into the thread in encapsulated form; the microcapsules of adhesive burst open under the shear forces operating as the bolt is turned. The adhesive thus released bonds and hardens in the thread.

The present invention may for example be employed in flame-type structures. Frame-type structures find application e.g. in vehicle body design, superstructures or bodywork or parts thereof, housings or housing parts of vehicles such as road and railway vehicles. Included in these are also e.g. buses for private and public transport, commercial transport vehicles with superstructures or rear-end constructions for vehicles, power-supply vehicles etc. The present invention in relation to frame-type structures encompasses such structures containing at least one corner joint according to the invention. Furthermore, the frame-type structures may also find application in ships, in constructions e.g. off-shore structures such as oildrilling platforms in the open sea or in masts of all kinds.

I claim:

1. Corner joint, which comprises:

a first section with C-shaped connecting means having outer surfaces;

a second section with C-shaped connecting means having outer surfaces and which is at an angle to the first section;

a corner connector located inside the outer surfaces of the first and second sections and including two movable angle pieces with two connector flanges that rest against said sections, said connector flanges being joined to said sections by at least one attachment means;

said sections including two parallel flanges and a strut on each parallel flange on the side facing the other parallel flange;

wherein each angle piece exhibits a first wedging face along the connector flanges resting against said sections and also a second wedging face on the side of the connector flange opposite said first wedging face; and wherein both of said sections have on the struts of both parallel flanges a ridge running parallel to the strut and a nose opposed to said ridge;

said connector flanges including said wedging faces which press against the nose on the strut;

said attachment means comprising:

a clamping piece engaging the ridges by virtue of the shape of the clamping piece;

at least one wedging piece which rests against the second wedging faces spreading apart the angle pieces; and a securing means bracing the wedging piece against the angle pieces;

wherein the clamping piece exerts a clamping action on said sections and wherein the wedging piece exerts a spreading action and the spreading action presses the angle pieces against said noses; and wherein said sections include a cross-strut extending perpendicular to said parallel flanges and forming a groove with said strut, wherein the connector flanges are pressed into said groove.

2. Joint according to claim 1, wherein each of the struts includes said ridge facing a free end of said parallel flange, and the clamping piece is a parallelogram-shaped plate which is penetrated by the securing means and includes projections that engage said ridges.

3. Joint according to claim 1, wherein the wedging piece has wedging faces and a wedging angle of the wedging faces of the connector flanges and wedging faces of the wedging piece are self-restricting.

4. Joint according to claim 1, wherein the two connector flanges are perpendicular to each other and have an outer face parallel to a plane defined by the connector flanges, wherein the connector flanges starting from the outer face exhibit said first wedging faces which are straight and the connector flanges on the sides opposite the outer faces exhibit said second wedging faces, and the first wedging faces extend over the connector flange.

5. Joint according to claim 4, wherein said first wedging face increases from the horizontal at a wedging angle of 5° to 30° and said second wedging face deviates from the vertical by a wedging angle of 5° to 30°.

6. Joint according to claim 5, wherein the wedging angle of said wedging faces is about 15°.

7. Joint according to claim 4, wherein said angle piece is drop forged.

8. Joint according to claim 4, wherein said angle piece is made of an aluminum alloy.

* * * * *